US010470382B2

(12) United States Patent
Jordan

(10) Patent No.: US 10,470,382 B2
(45) Date of Patent: Nov. 12, 2019

(54) MACHINE FOR DEBRANCHING LIVING TREES

(71) Applicant: advaligno GmbH, Wunstorf (DE)

(72) Inventor: Ernst Jordan, Neustadt (DE)

(73) Assignee: advaligno GmbH, Wunstorf (DE)

( * ) Notice: Subject to any disclaimer, the term of this patent is extended or adjusted under 35 U.S.C. 154(b) by 0 days.

(21) Appl. No.: 15/109,764

(22) PCT Filed: Dec. 30, 2014

(86) PCT No.: PCT/DE2014/100468
§ 371 (c)(1),
(2) Date: Jul. 5, 2016

(87) PCT Pub. No.: WO2015/101374
PCT Pub. Date: Jul. 9, 2015

(65) Prior Publication Data
US 2016/0324082 A1  Nov. 10, 2016

(30) Foreign Application Priority Data
Jan. 6, 2014  (DE) .......................... 10 2014 100 054

(51) Int. Cl.
*A01G 23/083* (2006.01)
*A01G 23/095* (2006.01)
*A01G 23/097* (2006.01)

(52) U.S. Cl.
CPC ................. *A01G 23/0955* (2013.01)

(58) Field of Classification Search
CPC ............... A01G 23/083; A01G 23/095; A01G 23/0955; A01G 23/097; A01G 23/08; A01G 23/093; A01G 23/0954
(Continued)

(56) References Cited

U.S. PATENT DOCUMENTS 3,198,224 A * 8/1965 Hiley ................... A01G 23/067
144/24.12
3,881,533 A * 5/1975 Savage ................ A01G 23/091
144/24.13
(Continued)

FOREIGN PATENT DOCUMENTS

| DE | 35 05 752 A1 | 8/1986 |
|---|---|---|
| DE | 101 24 611 B4 | 2/2005 |
| WO | 2010/024747 A1 | 3/2010 |

OTHER PUBLICATIONS

International Search Report of PCT/DE2014/100468, dated Jul. 14, 2015.

Primary Examiner — Shelley M Self
Assistant Examiner — Smith Oberto Bapthelus
(74) Attorney, Agent, or Firm — Collard & Roe, P.C.

(57) ABSTRACT

A machine for debranching living trees can move up and down the tree autonomously via a drive mechanism and has an upper cutting unit including three blades and below it a lower cutting unit including two blades. The in total five blades are arranged so that they cover the full girth of the tree. The two blades in the lower cutting unit are horizontally offset so that their end portions can overlap. To move the machine along the tree trunk there are two belt drives which press against the tree and are both driven by a single hydraulic motor. The upper cutting unit with its three blades can move horizontally as a whole, so that when the machine is moved and encounters thicker or slightly bent parts of the tree trunk it can give way in order to prevent the bark from being damaged by the blades.

10 Claims, 2 Drawing Sheets

Figure 1:
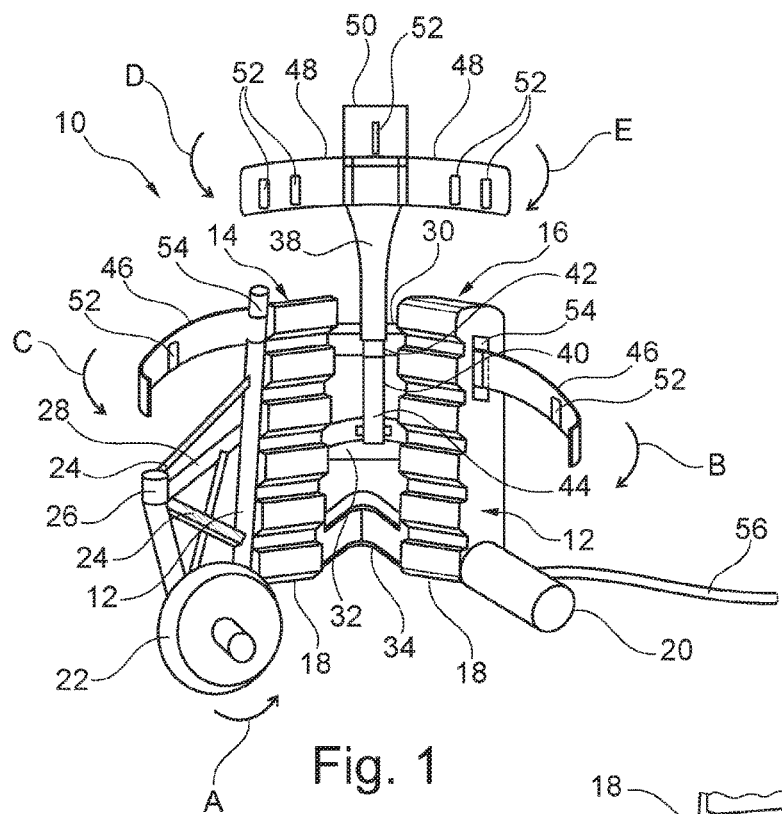

(58) Field of Classification Search
USPC .................................................... 144/24.13
See application file for complete search history.

(56) References Cited

U.S. PATENT DOCUMENTS

| | | | | | |
|---|---|---|---|---|---|
| 3,902,538 | A | * | 9/1975 | Muirhead | A01G 23/093 144/336 |
| 3,941,174 | A | * | 3/1976 | Oldenburg | A01G 23/083 144/208.7 |
| 3,981,336 | A | * | 9/1976 | Levesque | A01G 23/083 144/4.1 |
| 4,004,622 | A | * | 1/1977 | Hamilton | A01G 23/083 144/24.13 |
| 4,049,032 | A | * | 9/1977 | Oldenburg | A01G 23/083 144/24.13 |
| 4,128,986 | A | * | 12/1978 | Santarelli | A01D 46/26 294/104 |
| 4,279,281 | A | * | 7/1981 | Nakamura | A01G 23/0955 144/24.13 |
| 4,742,854 | A | * | 5/1988 | Forslund | B27B 25/04 144/24.13 |
| 4,753,338 | A | * | 6/1988 | Ketonen | A01G 23/097 144/245.2 |
| 4,766,939 | A | * | 8/1988 | Forslund | A01G 23/095 144/24.13 |
| 4,781,228 | A | * | 11/1988 | Vaders | A01G 23/0955 144/24.13 |
| 4,834,156 | A | * | 5/1989 | Forslund | B27L 1/045 144/24.13 |
| 5,086,819 | A | * | 2/1992 | Selby | A01G 23/095 144/24.13 |
| 5,735,325 | A | * | 4/1998 | Timperi | A01G 23/097 144/24.13 |
| 6,729,372 | B1 | * | 5/2004 | Koster | A01G 23/095 144/24.13 |
| 6,962,178 | B2 | * | 11/2005 | Duval | A01G 23/097 144/208.1 |
| 7,591,292 | B2 | * | 9/2009 | Happonen | A01G 23/0955 144/208.2 |
| 8,002,004 | B2 | * | 8/2011 | Smythe | A01G 23/095 144/24.13 |
| 8,992,159 | B2 | * | 3/2015 | Sintek | B66C 1/427 414/741 |
| 2004/0187462 | A1 | | 9/2004 | Jordan | |
| 2010/0230008 | A1 | * | 9/2010 | Kondo | A01G 23/083 144/338 |
| 2013/0248679 | A1 | * | 9/2013 | Hayden | A01G 23/0955 248/682 |
| 2013/0299046 | A1 | * | 11/2013 | Helenius | A01G 23/0955 144/343 |
| 2015/0144225 | A1 | * | 5/2015 | Stulen | B27L 1/005 144/208.91 |

* cited by examiner

MACHINE FOR DEBRANCHING LIVING TREES

CROSS REFERENCE TO RELATED APPLICATIONS

This application is the National Stage of PCT/DE2014/100468 filed on Dec. 30, 2014, which claims priority under 35 U.S.C. § 119 of German Application No. 10 2014 100 054.4 filed on Jan. 6, 2014, the disclosures of which are incorporated by reference. The international application under PCT article 21(2) was not published in English.

The invention relates to an apparatus for debranching of living trees.

Debranching of living trees, also referred to as branch removal to increase value or branch removal, particularly debranching of coniferous trees, is important both for forestry and for the wood and furniture industry.

Tree trunks free of knots are aimed at for wood processing. A significant gain in value is achieved by branch removal, because the production of branch-free wood for cutting is made possible.

Predominantly, debranching is used for pine trees and spruce trees; once these have been debranched, they continue to grow for many years and widen their diameter when doing so, but without the previously removed branches. After the grown trees are felled, the desired branch-free wood material is thereby available for the production of furniture.

Debranching of a tree is performed only once. At the time point of debranching, the average diameter of the trees lies at about 30 cm, while the diameter in the final state, when the tree is cut down, may amount to more than 1 m. Usually, debranching takes place in the lower region of the trees, up to a height of more than 10 m above the ground.

It has already been known for a long time to perform debranching by machine. In the document DE 101 24 611 B4, a debranching apparatus for removing the branches of living trees is described, which apparatus comprises a saw unit for removal of the branches, which unit consists of three separate circular saws, each having its own drive motor. In this regard, the saw unit is disposed on a rack.

The known apparatus furthermore comprises drive chains in the form of wide belts provided with a smooth surface. Using these drive chains, which lie against the tree with pressure, the apparatus travels upward on the tree trunk on its own, wherein the branches are removed by means of the saw unit.

In order for all the branches to be captured over the entire circumference of the tree trunk, the saw unit swings around the tree trunk, oscillating in the horizontal direction. When the rack of the saw unit has reached the desired height, it moves back down on the tree trunk.

Because of the bulky rack and because of the three individual circular saws, each having its own assigned drive motor, the known apparatus must be viewed as being complicated and susceptible to failure. If, for example, only one drive motor for a circular saw fails during robust operation in the forest, the entire apparatus can no longer function. Furthermore, the apparatus is not only susceptible to failure because of the many individual parts, but also expensive and comparatively heavy, thereby making its handling by operators difficult.

Furthermore, because of the oscillating movement of the individual circular saws in the horizontal direction, the speed at which the apparatus can moved up the tree trunk is limited. If the speed is too great, there is the risk that not all the branches of the tree trunk are captured, i.e. the required oscillating movement of the circular saws brakes the speed and thereby the degree of effectiveness of the apparatus.

A cutting apparatus for removal of branches from living trees is known from the document DE 35 05 752 A1, in which apparatus no saws, but rather two blades configured to be approximately circular and to draw at a slant are used. The blades stand under the effect of a spring force, by means of which they are pressed against the tree trunk.

A particular feature of this known apparatus consists in that a hydraulic lifting apparatus situated at a distance from the tree trunk is provided, with which the two blades provided for removing the branches are first moved upward and subsequently downward. Because the drive of the cutting apparatus does not take place by way of drive chains that lie against the tree bark with pressure, a pressure effect on the tree bark is avoided. A pressure effect on the tree bark can have a detrimental effect on the flow of tree sap that takes place through the tree bark, and can interrupt the flow of sap if the tree bark is damaged.

The flow of sap through the tree bark starts in the spring and lasts until late fall. The known apparatuses, in which the drive chains or other drive means lie against the tree bark with pressure and can damage it, under some circumstances, therefore allow safe debranching only within the relatively short winter time period, when the risk of interruption of the flow of sap is supposed to be avoided.

In spite of doing without drive chains that lie against the tree bark with pressure, the known apparatus has several disadvantages. For example, transport of the relatively heavy hydraulic lifting apparatuses with the two blades, from tree to tree, is complicated and costly.

A further disadvantage lies in that the movement of the blades, which runs upward, is dependent on precise setup and placement of the lifting apparatus on the ground, and is predetermined solely by the lifting movement of the hydraulic apparatus. If the hydraulic apparatus is not aligned so that the blades precisely follow the progression of the tree trunk as they move upward, the danger exists that the blades remove not just the branches but also parts of the tree bark. In order to avoid this, the hydraulic lifting apparatus must be positioned next to the tree in such a manner that the lifting movement always runs parallel to the tree trunk.

Guidance of the blades is rigidly predetermined by the movement of the lifting apparatus, which is directed vertically upward. The blades therefore cannot follow possible deviations of the tree trunk even if slight from the rigidly predetermined vertical direction, and in the case of such possible deviations of the progression of the tree trunk, the tree bark is damaged by the blades.

An apparatus for debranching living trees, having at least one cutting apparatus for cutting off and removing the branches of the trees, having a basic body having its own drive, having a motor as well as drive means that lie against the tree trunk in their working position, is known from the document US 2013/0 299 046 A1, wherein the apparatus can independently travel up and down the trunk of a tree.

The cutting apparatus comprises a first lower holding apparatus and a second upper cutting apparatus situated above the former. The lower holding apparatus comprises two arms that run in circular manner and are disposed to lie opposite one another, which arms are disposed offset in the vertical direction, wherein the two arms of the lower holding apparatus, together, form an arc that surrounds a first part of the circumference of the tree trunk, wherein the end regions of the two arms, in their working position, can overlap because of the arrangement of the two arms, wherein the end regions of the two lie one on top of the other, seen in the vertical direction.

The upper cutting apparatus comprises two blades that also run in circular shape and are disposed opposite one another, and in the center between the two blades of the upper cutting apparatus, a third blade is disposed above the two blades of the upper cutting apparatus. The three blades of the upper cutting apparatus, together, form an arc that surrounds a second part of the circumference of the tree trunk, so that the entire circumference of the tree trunk is covered by the blades of upper cutting apparatus, at every location along the region to be debranched.

This known apparatus, however, does not possess a support wheel that lies against the tree trunk in its working position. Furthermore, the blades of the upper cutting apparatus do not extend in the same plane, and the lower holding apparatus is not configured as a cutting apparatus.

The invention is based on the task of creating an apparatus for debranching of living trees, with which a harmful effect on the tree bark can be avoided. In addition, the apparatus is supposed to be easy to handle and to allow high speeds, at which the apparatus is moved up and down on the tree trunk, in order to thereby allow an improved degree of effect, connected with better efficiency. Furthermore, the apparatus is supposed to allow year-round use for debranching, without influencing the flow of sap through the tree bark.

The solution for this task takes place, in the case of the disclosed apparatus, by means of the characteristics disclosed herein.

The apparatus according to the invention comprises a first lower cutting apparatus and a second upper cutting apparatus situated above the former. The lower cutting apparatus possesses two blades that run in circular shape and are disposed opposite one another, and are disposed offset in the vertical direction.

The two blades of the lower cutting apparatus, together, form an arc that surrounds a first part of the circumference of the tree trunk, wherein the end regions of the two blades can overlap in their working position and cutting position, because of the offset arrangement of the two arms, wherein the end regions of the two blades then lie one on top of the other, seen in the vertical direction.

The upper cutting apparatus possesses two blades that also run in circular shape and are disposed to lie one on top of the other, but these are not offset in the vertical direction, but rather extend in the same plane. In the center between the two blades of the upper cutting apparatus, a third blade is additionally disposed above the two blades of the upper cutting apparatus.

The three blades of the upper cutting apparatus, together, form an arc that surrounds a second part of the circumference of the tree trunk, so that the entire circumference of the tree trunk is covered by the blades of the lower and upper cutting apparatus, at every location along the region to be debranched.

The invention proceeds from the assumption that the branches generally grow in a horizontal plane, in ring shape, around the tree trunk. When the apparatus according to the invention therefore moves upward on the tree, the branches are cut off by the individual blades, in four stages, because off the two cutting apparatuses that are provided.

First, the third blade of the upper cutting device, which is uppermost, seen in the vertical direction, goes into effect. Then the two other blades of the upper cutting apparatus, which covers a part of the circumference of the tree and thereby removes the branches situated on this part, which blades are disposed at the same height, follow.

Afterward, the lower cutting apparatus goes into effect; it covers the still missing part of the circumference of the tree trunk, and first engages with its upper blade, in the vertical direction. Then, last, the other blade of the lower cutting apparatus follows; it is disposed offset downward.

It is evident that in the case of the apparatus, the branches that have grown in ring shape in a horizontal plane are not all removed at once, but rather one after the other, in stages. This requires less force than is necessary if all the branches in a plane were to be cut off at once. The drive of the apparatus according to the invention can therefore be configured to be less high-powered, and nevertheless makes it possible to move the apparatus up and down the tree trunk at comparatively great speed, thereby increasing the degree of effectiveness.

In the invention, the two blades of the lower cutting apparatus are disposed offset relative to one another in the vertical direction. This is advantageous because in this way, it is taken into consideration that the diameter of the trees becomes smaller from bottom to top. At the bottom, the trees are thicker than at the top. In this regard, the difference in diameter can amount to as much as 10 cm.

Therefore, when the ends of the two blade halves move toward one another when moving upward, because the diameter becomes smaller, the offset arrangement ensures that the ends of the blades can overlap without touching, without problems, something that would be the case if the two blades were disposed in the same plane.

It has been shown that the weight of the apparatus according to the invention is relatively slight, so that the press-down pressure of the drive against the tree bark can also be kept slight. As a result, damage to the tree bark can be avoided, so that the apparatus can also be used year-round, without the flow of sap being interrupted.

A practical embodiment of the apparatus provides that the two blades of the lower and upper cutting apparatus, which blades lie opposite one another, can be pivoted and locked into a rest position facing away from the tree trunk, and can be pivoted into a working position in which they are pressed against the tree trunk by a force.

When the two cutting apparatuses are in their rest position, the apparatus can be set against the tree trunk. Subsequently, the blades are then pivoted into their working position, in which they are pressed against the tree trunk by a force, and afterward, the apparatus for debranching is moved upward on the tree trunk, using the drive. When debranching of a tree trunk is complete and the apparatus has moved back down, the blades can be pivoted again and locked in their rest position, and the apparatus can be removed from the respective tree and brought to the next tree.

A further advantageous embodiment of the invention provides that the third blade of the upper cutting apparatus is rigidly disposed between the two blades of the upper cutting apparatus that can pivot, and that the three blades of the upper cutting apparatus can be pivoted as a unit, as a whole, in the horizontal direction.

In practice, it should be noted that trees do not always grow upward in a precisely vertical direction, but rather have slight deviations or curvatures. If such a curvature is present when the apparatus moves upward, the upper cutting apparatus can adapt to this curvature and move away from the tree trunk horizontally in the direction of the curvature, thereby avoiding damage to the tree bark. The horizontal movement of the cutting apparatus takes place counter to the spring force of the springs assigned to the blades, and once the apparatus has moved past the curvature, the blades are once again pressed against the tree trunk in the opposite direction. The horizontal mobility of the upper cutting apparatus is therefore a major advantage of the invention.

Another practical further development of the invention consists in that the blades of the lower and upper cutting apparatus have at least one spacer on their inner side, which faces the tree trunk, by means of which spacer the blades are held at a slight distance from the tree trunk. The spacer ensures that the tree bark is not damaged during debranching.

In a further practical embodiment of the invention, the spacers are attached to the blades in releasable and replaceable manner. This makes it possible to adjust the distance between the tree bark and the blades differently, as necessary. It is practical if the distance of the blades from the tree trunk amounts to about 3-5 mm.

In advantageous manner, the blades of the lower or upper cutting apparatus are disposed on the basic body of the apparatus in replaceable manner. If the blades are dull after extended use, they can thereby be replaced with sharp blades, and the dull blades can be reground, besides.

In a practical embodiment of the invention, the drive means are formed by two belt drives attached to the basic body, at a distance and parallel, which drives are driven by a common hydraulic motor disposed on the basic body, and are pressed against the tree trunk with pressure.

Therefore only one common hydraulic motor is provided for the two belt drives, thereby making it possible to reduce the weight of the apparatus according to the invention in advantageous manner. The belt drives can be structured with a large contact surface, thereby reducing the press-down pressure against the tree bark.

In the case of the invention, it is practical that the hydraulic motor is supplied with the required hydraulic oil and pressure by a tractor, by way of a flexible hydraulic line.

Another further development of the invention provides that the belts of the two belt drives are configured to be profiled and are provided with depressions that run horizontally. Safe movement of the apparatus up and down along the tree trunk is achieved by means of the profiling.

Another advantageous further development of the invention consists in that the support wheel is attached to the basic body so as to pivot, and can be pivoted into a rest position and into a working position, wherein the support wheel, in its working position, lies against the tree trunk with pressure, centered relative to the two belt drives, and is pivoted away from the tree trunk and locked in its rest position.

In its working position, the support wheel guarantees that the belt drives that lie opposite one another lie against the tree trunk with pressure, and that the apparatus can therefore move safely along the tree trunk. In the rest position of the support wheel, the apparatus can be removed from the tree after debranching has taken place, and transported to the next tree.

Figure 2:
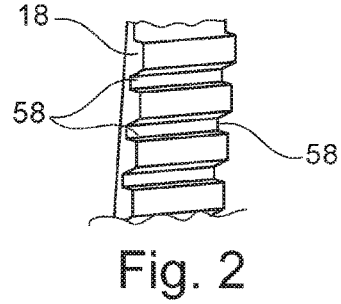
Figure 3:
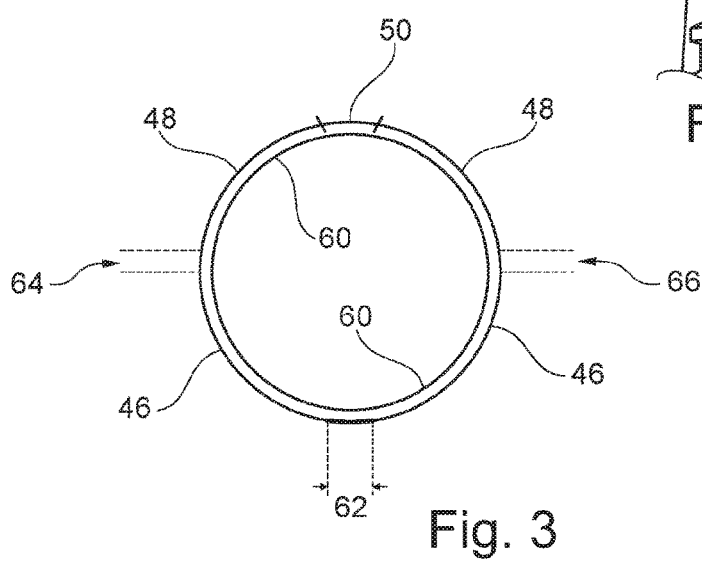
Figure 4:
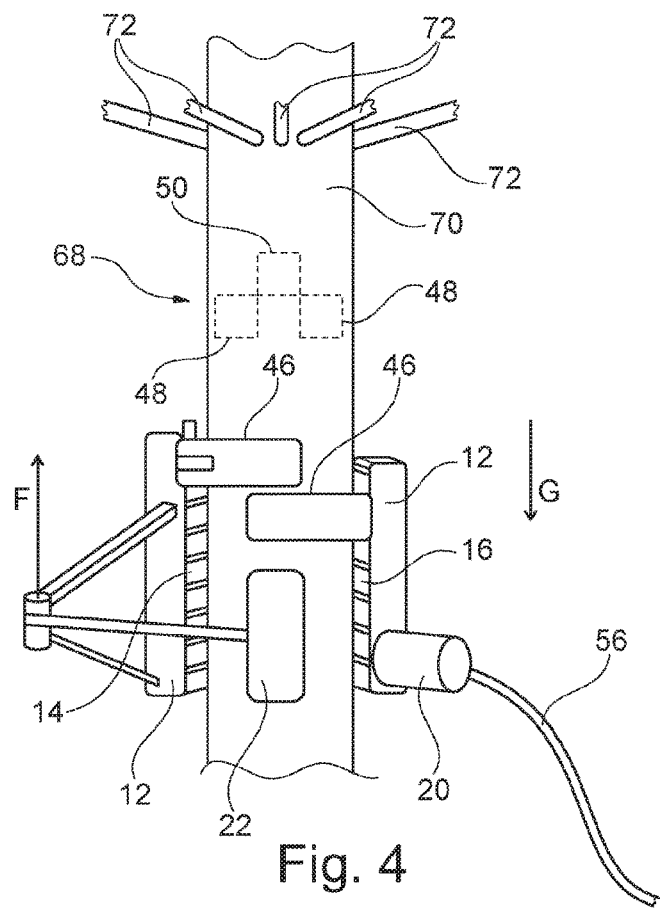
Figure 5:
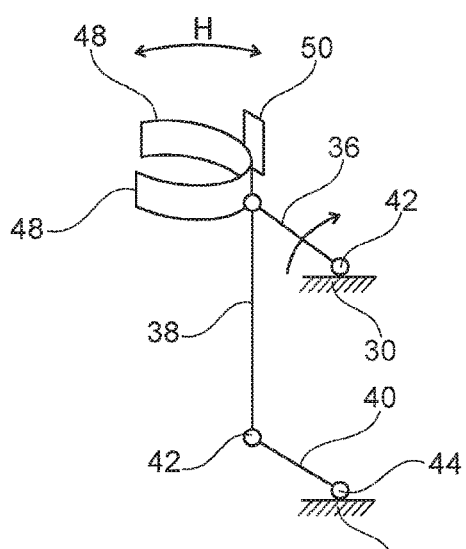

In the following, the invention will be explained and described in greater detail using an exemplary embodiment shown in the drawing. The figures show:

FIG. 1 a perspective representation of an apparatus according to the invention in its rest position, FIG. 2 a partial view of the profile of the belt drives, FIG. 3 a schematic representation of the circumference of the tree trunk covered by the blades of the apparatus, FIG. 4 an apparatus according to the invention in its working position, on a tree trunk, and FIG. 5 a schematic representation of the horizontal mobility of the upper cutting apparatus.

In FIG. 1, the apparatus 10 is shown in its rest position. The apparatus 10 comprises a two-part basic body 12, each part having a belt drive 14 and 16, respectively. The two belt drives 14 and 16 possess a drive belt 18, which lies against the trunk of a tree with pressure in the working position of the apparatus 10, so that the apparatus 10 can move up and down on the tree when the drive belt 18 is driven by a common hydraulic motor 20.

The apparatus 10 furthermore comprises a support wheel 22 that is held on the basic body 12 by way of rods 24. By way of a push rod 28 the support wheel 22 can be pivoted into its working position in the direction of the arrow A, by way of a joint 26, in which position it lies against a tree trunk with pressure.

The two basic bodies 12 are firmly connected with one another by way of an upper plate 30 and a center plate 32. In this regard, the two belt drives 14 and 16 stand at approximately a right angle relative to one another.

A blade rod 40 is attached to the plate 32 by way of a joint 42. The blade rod 40 is connected, by way of a further joint, with an upper blade rod 38, which, together with another blade rod 36 (see FIG. 5), carries the upper cutting apparatus.

This upper cutting apparatus comprises two lateral blades 48, which can be pivoted into their working position in the direction of the arrows D and E. A firmly fixed third blade 50 is situated above and between the two blades 48.

The lower cutting apparatus comprises two blades 46 disposed offset in the vertical direction, which are each disposed on the basic body 12. The two blades 46 can be pivoted into their working position in the direction of the arrows B and C, by way of joints 54; in this position, they lie against a tree trunk with pressure, under the effect of a spring, not shown here. On their inner side, facing the tree trunk, the blades of the upper and lower cutting apparatus possess replaceable spacers 52, by means of which the blades, which lie against the tree trunk with pressure in their working position, are held at a slight distance of 3 mm, for example, from the tree trunk, in order to avoid damage to the tree bark caused by the blades. The spacers 52 are slightly rounded off at their upper and lower ends, so that the tree bark is not damaged by the spacers 52 when the apparatus 10 moves up and down.

The hydraulic motor 20 is supplied by a tractor, not shown, by way of a flexible hydraulic line 56. The hydraulic motor 20 drives two belt drives 14 and 16, wherein the basic body 12 on which the hydraulic motor 20 is disposed can be driven directly, while the other, left basic body 12 is driven by way of a gear arrangement containing a bevel gear, which arrangement is situated in a housing 34. If only a single hydraulic motor 20 is provided for drive of the two belt drives 14 and 16, it is advantageous that only a single hydraulic line 46 is required, as well. Furthermore, the use of only one hydraulic motor 20 means a weight saving.

FIG. 2 shows, in a detail, a part of the surface of the belt drives 14 and 16. The drive belt 18 of the belt drives 14 and 16 has depressions 58 that run horizontally, thereby causing the drive belt 18 as a whole to be configured to be profiled, and the apparatus 10 can move along the tree trunk without the risk of slipping. Preferably, rubber of different hardness is used as the material for the drive belt 18. Depending on the composition of the trees, a soft rubber is used for smooth bark and a harder rubber is used for rough bark.

In FIG. 3, it is schematically shown how the blades 46, 48, and 50 of the lower and upper cutting apparatus completely surround the circumference 60 of a tree. The end regions of the two blades 46 disposed offset in the horizontal direction in an overlap region 62 represented with a thick line. In this overlap region 62, the ends of the blades 46 lie at a vertical distance from one another, without touching, because of their offset arrangement. In total, the two blades 46 in FIG. 3 cover a first lower part of the circumference 60.

The remaining upper part of the circumference 60 is covered by the blades 48 and 50, wherein the end regions of the two blades 48 slightly overlap the blades 46 situated underneath, in overlap regions 64 and 66. Therefore the entire circumference 60 of a tree trunk is covered with all the blades 46, 48, and 50.

FIG. 4 shows the cutting apparatus 10 in its working position, wherein the cutting apparatus 10 moves upward on a trunk 70 of a tree 68 in the direction of the arrow F, in order to remove branches 72 that have grown around the tree 68 in ring shape, in a plane. In this regard, the upper cutting apparatus, which is situated on the rear, non-visible side of the tree 68 in FIG. 4, comes into effect first and removes the branches 72 on a first part of the tree circumference.

During further upward movement in the direction of the arrow F, the two blades 46 of the lower cutting apparatus, which are disposed offset, then engage and remove the branches 72 on the remaining part of the tree circumference, wherein first, the left upper blade 46 engages, and afterward the right lower blade 46 engages. When all the branches 72 up to the desired height have been removed, the apparatus 10 is moved back down the tree 68 to the starting point, in the direction of the arrow G.

The runner wheel 22 is in its working position, in which it lies against the tree trunk 70 with pressure, and this pressure ensures that the belt drives 14 and 16 are also pressed against the tree. In order to allow a uniform press-down pressure for the two belt drives 14 and 16, the runner wheel 22 is disposed centered between the two belt drives 14, 16, which are situated at a right angle relative to one another.

The belt drives 14, 16 possess a large surface area, thereby making it possible to keep the press-down pressure of the belt drives 14, 16 against the tree bark low. As a result, damage to the tree bark can be avoided.

In the schematic drawing according to FIG. 5, it is shown that the upper cutting apparatus with its blades 48 and 50 is not rigidly disposed on the basic body 12 but rather, seen as a whole, can be pivoted in the horizontal direction, in accordance with the double arrow H. If, while the apparatus 10 moves upward, the uppermost blade 50 of the upper cutting apparatus encounters a progression of the tree trunk that deviates from the vertical, in the form of a thickening or a slight curvature, the upper blade 50 gives way and adapts to the progression of the tree trunk, in that it pivots in the direction away from the tree trunk. In this way, it is avoided that the bark of the tree 68 is damaged by the upper cutting apparatus at the location of the thickening or curvature.

The horizontal mobility of the upper cutting apparatus is made possible in that it is connected with the plate 30 by way of a blade rod 36, by way of the joint 42. Furthermore, the blade rod 38 is connected with the blade rod 40 by way of the joint 42, which rod in turn is attached to the plate 32 by way of the joint 44. In this way, the horizontal mobility of the upper cutting apparatus is made possible in the manner of a parallelogram.

REFERENCE SYMBOL LIST (is part of the description)
10 apparatus
12 basic body
14 belt drive
16 belt drive
18 drive belt(s)
20 hydraulic motor
22 support wheel
24 rods
26 joint
28 push rod
30 plate
32 plate
34 housing
36 blade rod
38 blade rod
40 blade rod
42 joint
44 joint
46 blade
48 blade
50 blade
52 spacer
54 joint
56 hydraulic line
58 depression
60 circumference (of the tree)
62 overlap region
64 overlap region
66 overlap region
68 tree
70 tree trunk
72 branches
A arrow
B arrow
C arrow
D arrow
E arrow
F arrow
G arrow
H double arrow

The invention claimed is:

1. A cutting apparatus for debranching a living tree, the living tree having a tree trunk with a trunk circumference, the cutting apparatus being movable between a rest position and a working position, wherein the cutting apparatus comprises:
 a basic body;
 a first belt drive attached to said basic body;
 a second belt drive attached to said basic body and disposed at a distance from and parallel to said first belt drive;
 a motor coupled to said first belt drive and said second belt drive;
 a support wheel attached to said basic body so as to pivot, wherein said support wheel pivots into a rest position and a working position, wherein in the working position of said support wheel, said support wheel lies against the tree trunk with pressure, centered relative to said first belt drive and said second belt drive, thereby ensuring that said first belt drive and said second belt drive are pressed against the tree trunk with pressure, and in the rest position of said support wheel, said support wheel is pivoted away from the tree trunk and locked;
 wherein in the working position of the cutting apparatus, said first belt drive, said second belt drive and said support wheel lie against the tree trunk with pressure and said motor is operable to drive said first belt drive and said second belt drive to displace the cutting apparatus vertically up and down the tree trunk;
a lower cutting apparatus attached to said basic body; and
an upper cutting apparatus attached to said basic body and situated vertically above said lower cutting apparatus;
said lower cutting apparatus comprising two lateral arcuate blades, said two lateral arcuate blades comprising a first lower blade and a second lower blade disposed vertically offset relative to said first lower blade, such that in the working position of the cutting apparatus, a distal end of said first lower blade and a distal end of said second lower blade can partially overlap each other in a first overlap region;
said upper cutting apparatus comprising three lateral arcuate blades, said three lateral arcuate blades comprising a first upper blade, a second upper blade disposed vertically aligned with said first upper blade and a third upper blade disposed between and vertically above said first upper blade and said second upper blade;
wherein in the working position of the cutting apparatus, a distal end of said first upper blade partially overlaps a proximate end of said first lower blade in a second overlap region and a distal end of said second upper blade partially overlaps a proximate end of said second lower blade in a third overlap region;
wherein in the working position of the cutting apparatus, said first lower blade and said second lower blade together form a first arc conforming to a first partial portion of the trunk circumference;
said first upper blade, said second upper blade and said third upper blade together form a second arc conforming to a second partial portion of the trunk circumference, different from said first partial portion; and
said first arc formed by said first lower blade and said second lower blade and said second arc formed by said first upper blade, said second upper blade and said third upper blade together completely surround the trunk circumference.

2. The cutting apparatus according to claim 1, wherein in the rest position of the cutting apparatus, said first lower blade, said second lower blade, said first upper blade and said second upper blade are pivoted and locked in a position away from the tree trunk, and in the working position of the cutting apparatus, said first lower blade, said second lower blade, said first upper blade and said second upper blade are pivoted into a position in which they are pressed against the tree trunk by a force.

3. The cutting apparatus according to claim 2, wherein said third upper blade is rigidly disposed between said first upper blade and said second upper blade that pivot, and wherein said first upper blade, said second upper blade and said third upper blade additionally pivot as a unit, as a whole, in a horizontal direction.

4. The cutting apparatus according to claim 1, wherein said first lower blade, said second lower blade, said first upper blade, said second upper blade and said third upper blade have at least one spacer on a respective inner side thereof, which faces the tree trunk, by means of which spacer said first lower blade, said second lower blade, said first upper blade, said second upper blade and said third upper blade are held at a distance from the tree trunk.

5. The cutting apparatus according to claim 4, wherein the spacers are attached to said first lower blade, said second lower blade, said first upper blade, said second upper blade and said third upper blade in a releasable and replaceable manner.

6. The cutting apparatus according to claim 4, wherein the distance of said first lower blade, said second lower blade, said first upper blade, said second upper blade and said third upper blade from the tree trunk amounts to 3-5 mm.

7. The cutting apparatus according to claim 1, wherein said first lower blade, said second lower blade, said first upper blade, said second upper blade and said third upper blade are disposed on said basic body in a replaceable manner.

8. The cutting apparatus according to claim 1, wherein said motor is a common hydraulic motor disposed on said basic body.

9. The cutting apparatus according to claim 8, wherein said hydraulic motor is supplied with hydraulic oil and pressure by a tractor via a flexible hydraulic line.

10. The cutting apparatus according to claim 8, wherein said first belt drive and said second belt drive comprise respective belts having a profiled configuration and provided with depressions that run horizontally.

* * * * *